United States Patent
Sarkkinen et al.

(10) Patent No.: US 7,860,462 B2
(45) Date of Patent: Dec. 28, 2010

(54) ADAPTIVE POWER CONTROL FOR MULTICAST TRANSMISSISON

(76) Inventors: Sinikka Sarkkinen, Kisällinkuja 5, 36200 Kangasala (FI); Jari Isokangas, Kelohongankatu 1 B4, 33820 Tampere (FI); Dimitris Koulakiots, 25 Riven Court 143 Inverness Terrace, Bayswater W26Ja, London (GB)

( * ) Notice: Subject to any disclaimer, the term of this patent is extended or adjusted under 35 U.S.C. 154(b) by 286 days.

(21) Appl. No.: 11/332,751

(22) Filed: Jan. 13, 2006

(65) Prior Publication Data
US 2006/0154686 A1 Jul. 13, 2006

Related U.S. Application Data

(63) Continuation of application No. 10/076,617, filed on Feb. 19, 2002, now Pat. No. 7,006,844.

(51) Int. Cl.
*H04B 7/00* (2006.01)
*H04B 17/00* (2006.01)
*H04Q 11/12* (2006.01)

(52) U.S. Cl. ............... 455/69; 455/522; 455/127.1; 455/67.13

(58) Field of Classification Search ............... 455/522, 455/69, 127.1, 68, 450, 403; 370/335, 348
See application file for complete search history.

(56) References Cited

U.S. PATENT DOCUMENTS

| 5,056,109 A | 10/1991 | Gilhousen et al. | |
|---|---|---|---|
| 5,420,911 A | 5/1995 | Dahlin et al. | |
| 5,542,093 A | 7/1996 | Bodin et al. | |
| 5,761,621 A | 6/1998 | Sainton | |
| 5,881,368 A | 3/1999 | Grob et al. | |
| 5,881,372 A | 3/1999 | Kruys | |
| 6,085,108 A * | 7/2000 | Knutsson et al. | 455/522 |
| 6,134,443 A | 10/2000 | Spann et al. | |
| 6,292,471 B1 * | 9/2001 | Cao et al. | 370/252 |
| 6,311,070 B1 | 10/2001 | Tong et al. | |
| 6,374,085 B1 * | 4/2002 | Saints et al. | 455/69 |
| 6,374,109 B1 | 4/2002 | Shaheen et al. | |
| 6,389,265 B1 * | 5/2002 | Jeschke et al. | 455/69 |
| 6,400,960 B1 * | 6/2002 | Dominique et al. | 455/522 |
| 6,556,838 B1 * | 4/2003 | Baker et al. | 455/522 |
| 6,650,905 B1 * | 11/2003 | Toskala et al. | 455/522 |
| 6,728,226 B1 * | 4/2004 | Naito | 370/328 |
| 6,728,292 B2 * | 4/2004 | Zeira et al. | 375/130 |
| 6,819,937 B2 * | 11/2004 | Knuutila et al. | 455/522 |
| 6,909,880 B2 * | 6/2005 | Kojima et al. | 455/63.1 |

(Continued)

FOREIGN PATENT DOCUMENTS

EP 1063782 12/2000

*Primary Examiner*—Tilahun Gesesse
(74) *Attorney, Agent, or Firm*—Knobbe Martens Olson & Bear LLP (57) ABSTRACT

The power level of multicast data transmissions in a wireless communications network are controlled. Power level information is provided in a transmitted channel received by a user equipment. The user equipment measures the power level of a received signal. It compares the measured power level to the power level indicated by the power level information provided in the transmitted channel. Power level measurement information is included in a message sent by the user equipment depending on the results obtained when the power level measured by the user equipment is compared to the power level indicated by the power level information provided in the transmitted channel.

27 Claims, 7 Drawing Sheets

U.S. PATENT DOCUMENTS

| | | |
|---|---|---|
| 7,058,406 B1 * | 6/2006 | Lundell et al. .............. 455/437 |
| 7,239,880 B2 * | 7/2007 | Shaheen .................... 455/458 |
| 7,257,399 B2 * | 8/2007 | Pedlar ....................... 455/425 |
| 7,457,260 B2 * | 11/2008 | Torsner et al. .............. 370/328 |
| 2001/0046877 A1 * | 11/2001 | Ohkubo et al. .............. 455/522 |
| 2002/0071480 A1 * | 6/2002 | Marjelund et al. .......... 375/141 |
| 2003/0100269 A1 | 5/2003 | Lehtinen et al. |
| 2003/0157952 A1 | 8/2003 | Sarkkinen et al. |

* cited by examiner

| Group id | UE id | Power inf | Location inf |
|---|---|---|---|
| Xxx | Xx1 | +11 | 1 |
| yyy | X11 | -4 | 1 |
| zzz | X21 | -3 | 2 |
| yyy | X33 | +3 | 2 |
| yyy | X75 | +2 | 4 |
| xxx | X45 | -35 | 1 |
| yyy | X34 | 000 | 2 |

FIG. 7

| Information Element/Group name | Need | Multi | Type and reference | Semantics description |
|---|---|---|---|---|
| Message Type | MP | | Message Type | |
| UE information elements | | | | |
| U-RNTI | MP | | U-RNTI 10.3.3.47 | |
| RRC transaction identifier | CV Failure | | RRC transaction identifier 10.3.3.36 | |
| Integrity check info | CH | | Integrity check info 10.3.3.16 | |
| START list | MP | 1 to <maxCNdomains> | | START [40] values for all CN domains. |
| >CN domain identity | MP | | CN domain identity 10.3.1.1 | |
| >START | MP | | START 10.3.3.38 | START value to be used in this CN domain |
| AM_RLC error indication(RB2, RB3 or RB4) | MP | | Boolean | TRUE indicates AM_RLC unrecoverable error [16] occurred on RB2, RB3 or RB4 in the UE |
| AM_RLC error indication (RB>4) | MP | | Boolean | TRUE indicates AM_RLC unrecoverable error [16] occurred on RB>4 in the UE |
| CELL update cause | MP | | Cell update cause 10.3.3.3 | |
| Failure cause | OP | | Failure cause and error information 10.3.3.14 | |
| RB timer indicator | MP | | RB timer indicator 10.3.3.28 | |
| Mu Power control ind. | OP | | | Identifies requested power level for multicast services |
| Mu-UE identity | OP | | | Identifies certain multicast subscriber |
| Multicast group/service identity | OP | | | Identifies certain multicast group or services |
| Measurement information elements | | | | |
| Measured results on RACH | OP | | Measured results on RACH 10.3.7.45 | |

(The last four rows above the Measurement section are indicated as RRC (25.331) changes)

| Condition | Explanation |
|---|---|
| Failure | This IE is mandatory present if the IE "Failure cause" is present and not needed otherwise. |

FIG. 8

| Information Element/Group name | Need | Multi | Type and reference | Semantics description |
|---|---|---|---|---|
| Message Type | MP | | Message Type | |
| UE information elements | | | | |
| U-RNTI | MP | | U-RNTI 10.3.3.47 | |
| RRC transaction identifier | CV-ProtErr | | RRC transaction identifier 10.3.3.36 | |
| Integrity check info | CH | | Integrity check info 10.3.3.16 | |
| URA update cause | MP | | URA update cause 10.3.3.46 | Default value is FALSE |
| Protocol error indicator | MD | | Protocol error indicator 10.3.3.27 | |
| Mu Power control ind. | OP | | | Identifies requested power level for multicast services |
| MU-UE identity | OP | | | Identifies certain multicast subscriber |
| Multicast group/service identity | OP | | | Identifies certain multicast group or services |
| Other Iinformation elements | | | | |
| Protocol error information | CV-ProtErr | | Protocol error information 10.3.8.12 | |

| Condition | Explanation |
|---|---|
| ProtERR | The IE is mandatory present if the IE "Protocol error indicator" has the value "TRUE" and not needed otherwise. |

RRC (25.331) changes: { Mu Power control ind., MU-UE identity, Multicast group/service identity }

FIG. 9

| Information Element/Group name | Need | Multi | Type and reference | Semantics description |
|---|---|---|---|---|
| Message Type | MP | | Message Type | |
| UE information elements | | | | |
| Mu-UE identity | MP | | | Identifies certain multicast subscriber |
| Multicast group/service identity | MP | | | Identifies certain multicast group or service |
| Mu Power control ind. | OP | | | Identifies requested power level for multicast services |

RRC (25.331) changes

FIG. 10

| Information Element/Group name | Need | Multi | Type and reference | Semantics description |
|---|---|---|---|---|
| Message Type | MP | | Message Type | |
| UE INFORMATION ELEMENTS | | | | |
| Integrity check info | CH | | Integrity check info 10.3.3.16 | Integrity check info is included if integrity protection is applied |
| CN information elements | | | | |
| CN domain identity | MP | | CN domain identity 10.3.1.1 | |
| NAS message | MP | | NAS message 10.3.1.8 | |
| MU-UE identity | OP | | | Identifies certain multicast subscriber |
| Multicast group/service identity | OP | | | Identifies certain multicast group or service |
| Mu Power control ind. | OP | | | Identifies requested power level for multicast services |
| Old multicast area identity | OP | | | To indicate the old multicast area. New RNC can used this identity to update the multicast status information in the old RNC |
| Measurement information elements | | | | |
| Measured results on RACH | OP | | Measured results on RACH 10.3.7.45 | |

RRC (25.331) changes: MU-UE identity, Multicast group/service identity, Mu Power control ind., Old multicast area identity

ADAPTIVE POWER CONTROL FOR MULTICAST TRANSMISSISON

RELATED APPLICATION

This application is a continuation of U.S. application Ser. No. 10/076,617, filed Feb. 19, 2002, the contents of which are incorporated here by reference in its entirety.

BACKGROUND

1. Field of the Invention

The present invention is related to a method or apparatus providing a multicast transmission in a communications network. More particularly, the present invention is related to a method or apparatus controlling the power of a multicast transmission in a wireless communications network.

2. Discussion of the Related Art

3GPP TS 23.041 V4.1.0 (2001-06) describes a Cell Broadcast Service (CBS) for a wireless communications network according to the specifications of the 3rd Generation Partnership Project (www.3GPP.org) which is similar to Teletext service offered on television, in that it permits a number of general messages to be broadcast and received by all receivers within a particular region. These CBS messages are broadcast to defined geographical coverage areas also called cell broadcast areas. A cell broadcast area may comprise one or more cells, or may comprise the entire cellular network. Individual CBS messages are assigned their own cell broadcast area by a mutual agreement between the information provider and the network operator. They may originate from a number of different Cell Broadcast Entities (CBEs), which are connected to a Cell Broadcast Center (CBC). CBS messages are then sent from the CBC to the cells via a radio access network in accordance with the CBS's coverage requirements.

CBS has the disadvantage that the messages are broadcast indiscriminately to all receivers within the geographical coverage area. It cannot identify different user equipment (UE) comprising a multicast group or make evaluations between different cells (e.g., the number of UEs in a cell, etc.) or between different sessions (e.g., delay requirements for transmission, session priority, etc.)

3GPP TS 22.146 V2.0.0 (2001-09) describes, at a high level, the requirements desired for an envisioned multicast service. Unlike CBS, the multicast service uses common network resources to provide data communications only to a restricted group of people in one or more cells of the network who previously indicated their interest to receive the multicast service.

The intent is to enhance the current capabilities of the Universal Terrestrial Radio Access Network (UTRAN) and the Core Network (CN) to make them become capable of providing the envisioned multicast service. For example, the core network which knows only the Location/Routing area level of the UEs of a plurality of service subscribers will forward the data to be multicast to the UTRAN. The UTRAN, which knows the various cell locations of the UEs, in turn transmits the data to each of the UEs in a cell through one common physical channel on the radio interface. The transmissions of the multicast data in the various cells may be simultaneous or may be scheduled. Possible physical channels could be, for example, the Secondary Common Control Physical Channel (SCCPCH) which is currently used to transmit data of the transport channel and the Fast Access Channel (FACH) which can transmit CBS data as well as other types of data.

The power level used for the transmission of a common physical channel (for example, open loop power control) is typically defined based on cell structure and the conditions of the air interface (i.e., as defined by the radio access network) without checking the conditions in the cell from the UE point of view or the locations of the UEs. It is typically fixed and set high enough so that the UE furthest from the base station and almost at the border of the cell is able to receive the transmission. This has the disadvantage that the power level is unnecessarily high for most of the UEs. From the air interface point of view, it also results in interference which could be avoided if the radio access network had information about authorized UEs in the cell.

Location information at least from URA (UTRAN Registration Area) level can usually only be fetched from a Radio Network Controller (RNC) if the authorized UEs and the LTEs are in a Radio Resource Controller (RRC) connected state. However, it is more than likely that most of the UEs are in IDLE mode and have no RRC connection. Therefore, their precise location is unknown to the radio access network and the power level of the multicast data transmission cannot be controlled accordingly. In order to transmit the multicast data more efficiently, the radio access network should know the condition in the cell from the LE point of view and the locations of the authorized UEs, such as whether there are any UEs in a cell upon activation of the multicast data transmission, and adaptively control the power level accordingly before transmitting the data. Thus, there is a need for a system or apparatus for allowing the RNC to keep a record of the location of the UEs in the cells even though they are in the IDLE mode.

BRIEF SUMMARY

In the preferred embodiments of the invention, a radio access network defines the power level used for data transmissions in a multicast service based on information received from UEs authorized to receive those multicast services. The UEs can be authorized, for example, by the subscriber (i.e., an owner of a Subscriber Identification Module card) making a service subscription in advance with a service provider. Preferably, but not necessarily, this information necessary for controlling the power level is provided without establishing any dedicated uplink feedback channels before or during the transmission of the multicast data in a session. The power level used can be less than the maximum level which would otherwise be used to transmit multicast data on one common physical channel.

One object of the preferred embodiments is to include radio interference measurements in a UE when the UE is already active and to use such procedures between UE and the network, which are already available for purposes other than power level control or which do not require any hard signaling exchange transactions in order to transmit required information from the UE to the network. The embodiments do not limit the details of the measurements performed by the UE or the types of signals or values produced by the measurements and calculations.

DESCRIPTION OF THE PREFERRED EMBODIMENTS

The particulars shown herein are by way of example and for purposes of illustrative discussion of the preferred embodiments of the present invention. The description taken with the drawings makes it apparent to those skilled in the art how other various embodiments of the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions Although the preferred embodiments of the present invention may be described using an example system block diagram in a 3G wireless communication network compatible or backward compatible with the specifications promulgated by the 3rd Generation Partnership Project, practice of the invention is not limited thereto, i.e., the invention may be able to be practiced with other types of wireless communication networks, and in other types of environments.

Reference in the specification to "the preferred embodiment" or "an embodiment" means that a particular feature, structure, or characteristic described in connection with the embodiment is included in at least one embodiment of the invention. The appearances of the phrase "the preferred embodiment" in various places in the specification are not necessarily all referring to the same embodiment.

The present invention is related to methods and systems for location registration and management of UEs in a UTRAN authorized to receive a multicast service announcement in a cell where a network continuously indicates the status of the multicast service situation to the cell. This makes joining the multicast service much easier from a UE point of view. The present invention is also related to methods and systems for a multicast service announcement in a cell where networks indicate when the network is about to start the next multicast session in order to allow UEs to wake up on the correct moment. User equipment (UE) according to the present invention may be a mobile network node (e.g., a mobile phone, Personal Data Assistant (PDA), or laptop computer) or non-mobile network node.

Figure 1:
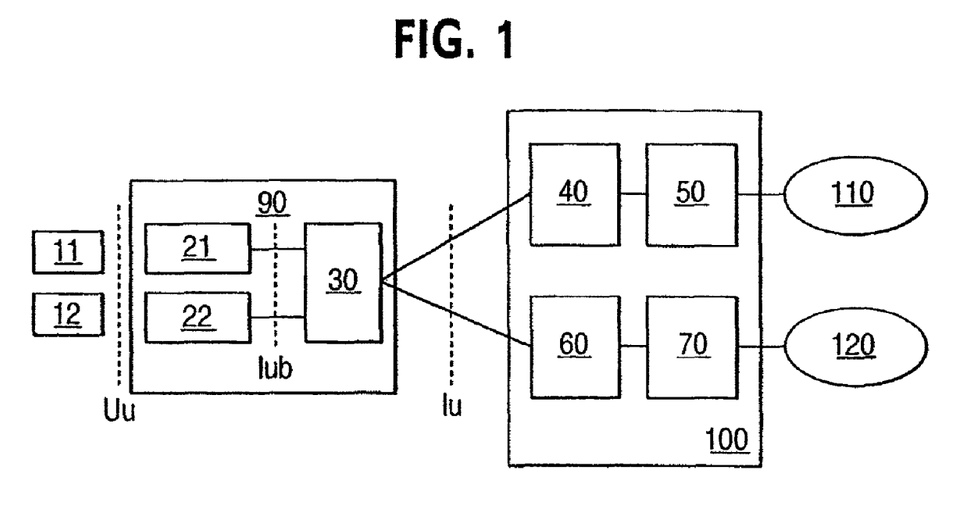
FIG. 1 is a schematic block diagram indicating a network architecture in which the preferred embodiments of the invention can be implemented.

The preferred embodiments of the invention will be described with reference to the basic network architecture comprising a UTRAN 90 and a CN 100 shown in FIG. 1. First and second UE 11, 12 are connected via the Uu radio interface to respective first node B 21 and second node B 22 of UTRAN 90. First node B 21 and second node B 22 participate in the same radio resource management and have the same function as a generic base station. Furthermore, the UTRAN 90 comprises at least one Radio Network Controller (RNC) 30, which is connected to first node B 21 and second node B 22 via the Iub interface and is responsible for the control of the radio resources in its domain, i.e. first node B 21 and second node B 22. RNC 30 is the service access point for all services the UTRAN 90 provides to the CN 100.

CN 100 comprises a Mobile Switching Center/Visitor Location Register (MSC/VLR) 40 which is a switch (MSC) and database (VLR) that conventionally serves a UE for circuit switched (CS) services. The MSC function is used to switch the CS transactions, and the VLR function holds a copy of the visiting user's service profile, as well as information on the UE's location within the serving system. The part of the network which is accessed via the MSCNLR 40 is often referred to as CS domain. The MSC/VLR 40 is connected to a Gateway MSC (GMSC) 50 which is a switch at the point where the CN 100 is connected to external CS networks 110, e.g. Public Switched Telephone Networks (PSTNs), Integrated Services Digital Networks (ISDNs) or Public Land Mobile Networks (PLMNs). All incoming and outgoing CS connections go through the GMSC 50.

Furthermore, CN 100 comprises a Serving GPRS (General Packet Radio Services) Support Node (SGSN) 60 having a function similar to the MSC/VLR 40 but typically used for packet switched (PS) services. The part of the network accessed via the SGSN 60 is often referred to as the PS domain. The SGSN 60 is connected to a gateway GPRS Support Node (GGSN) 70 having functionality similar to the GMSC 50 but for PS services. The GGSN 70 is thus a switch at the point where the CN 100 is connected to external PS networks 120, such as the Internet.

MSC/VLR 40 and the SGSN 60 are connected to the RNC 30 via the Iu-interface which thus connects the UTRAN 90 to the CN 100. The Iu-interface is preferably an open standards interface which handles switching, routing and service control.

To achieve a multicast transmission function between the CN 100 and the UTRAN 90 via the Iu-interface, different characteristics of the multicast related data transmission need to be taken into account not only upon the active data transmission, but also upon reservation and configuration of the required resources from Iu-interface. For these different phases, 3GPP TS 25.331 V3.9.0 (2001-12) defines signaling protocols such as RANAP (Radio Access Network Application Part) and Iu_UP (Iu Interface User Plane Protocol). RANAP is a signaling protocol in the Iu-interface that contains all control information specified for the Radio Network Layer used for UTRAN-related issues. The Iu_UP also belongs to the Radio Network Layer and is independent of the CN domain that it is used for as much as possible. The purpose of the Iu_UP is to carry user data related to Radio Access Bearers (RABs) over the Iu-interface. Each RAB has its own instance of the protocol. The protocol performs either a fully transparent operation, or framing for user data segments and some basic control signaling to be used for initialization and online control. Based on these cases, the Iu_UP has two modes, i.e, a transparent mode for fully transparent operation and a support mode for predefined SDU (Service Data Unit) sizes corresponding to framed user data segments. Only upon the support mode, control procedures are specified.

Thus, the Iu UP is the only protocol in the above group, which is capable of transmitting not only control information but also user plane data (i.e. in this case multicast related data) and therefore it is a candidate for the user plane data transmission and the transmission of connection related control information over the Iu-interface. RANAP can be used for transmission of control information and therefore they are not directly available for multicast data transmission. The RANAP messages can be used to configure and reserve resources from the Iu-interface for the multicast session.

Figure 2:
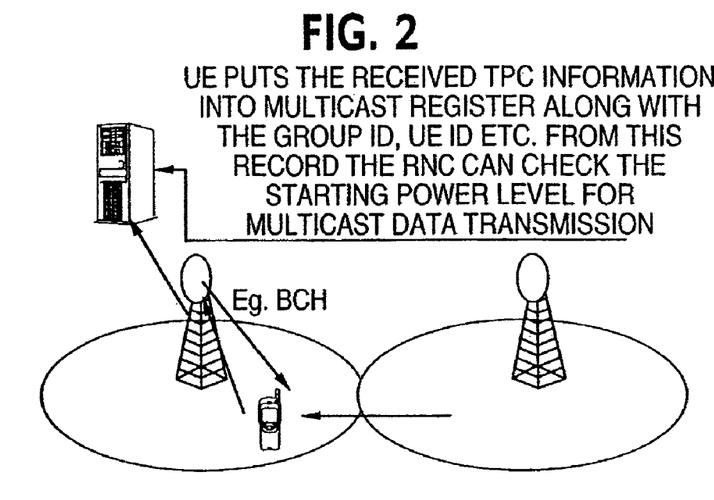
FIG. 2 illustrates a transaction performed when a UE enters a new cell according to a preferred embodiment of the invention.
Figure 3:
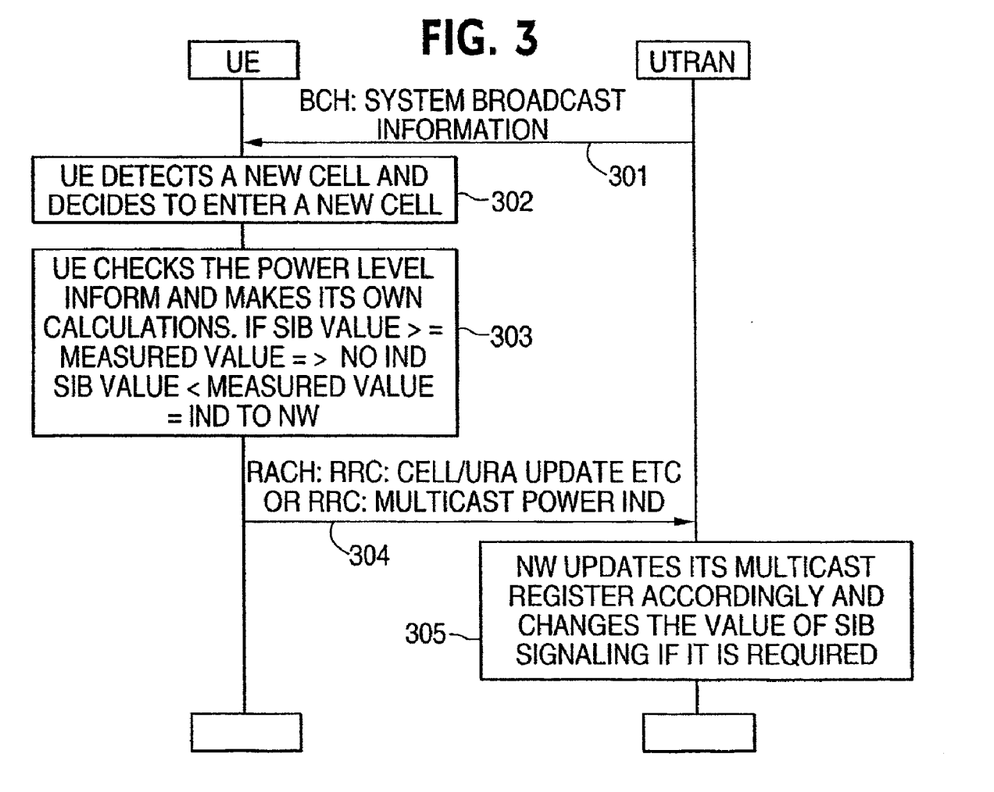
FIG. 3 is a flow diagram indicating the operations performed when the UE enters a new cell according to a preferred embodiment of the invention.

The operations which are performed in UE 11 or 12 according to a preferred embodiment of the invention are illustrated in FIGS. 2-5. In general, UE 11 or 12 receives system broadcast information (i.e., System Information Block (SIB) signalling messages) in the Broadcast Channel (BCH) transport channel mapped into a Primary Common Control Physical Channel (PCCPCH) (301 in FIG. 3) in the cells of a wireless communication network. When the UE 11 or 12 enters a new cell as shown in FIGS. 2 and 302 in FIG. 3, the UE 11 or 12 generally performs any number of possible area update procedures (cell/URA/Link Adaption (LA)/Radio Access (RA), etc). At this time, the UE 11 or 12 checks the power level used for the multicast sessions in the cell. It does this by measuring the air interface based on information e.g., the signal to noise ration (Eb/No), block error rate (BLER), bit error rate (BER) or other transport power control (TPC) in a received downlink channel (i.e., system broadcast information in the Broadcast Channel (BCH)/PCCPCH as shown in FIGS. 2 and 3, or SCCPCH which typically contains paging messages or FACH, etc.). These measurements and possible calculations produce a power level value. This power level value can be compared to the values received in SIB signaling messages. Depending on the results obtained from the comparison, UE 11 or 12 may or may not send an indication to UTRAN 90. For example, if the comparison indicates that the measured value is less than the values received in the SIB signaling messages, then UE 11 or 12 may send an indication to UTRAN 90 (303 in FIG. 3).

Whether UE 11 or 12 sends a power level measurement indication may be based on any number or combination of factors in addition to the simple logical comparison of the relative values described in the previous paragraph. For example, it could depend on how small the difference is between the measured value and power value received in the SIB signaling messages or whether the value exceeds the "absolute highest power level" indicated in the SIB signaling messages. It could depend on the priorities of the multicast services which it is capable of receiving. It could also depend on the type of multicast service it is capable of receiving (e.g., a multicast service tied to a certain place such as a mall or sports arena). There may be a plurality of different power level measurement indication types corresponding to the various combinations of factors.

If UE 11 or 12 decides to send information on the measured power level in order to control the power level, that information can be included and sent in a conventional message, such as a RRC Cell Update message, a RRC URA Update message or a RRC LA Update message. Alternatively, the information may be included in a RRC Multicast Area Update message or a RRC Multicast Power Indication message, as hereafter described. (304 in FIG. 3) Preferably, UE 11 or 12 decides which message type is used. Also, if for some reason no update procedure is performed when UE 11 or 12 enters the new cell, UE 11 or 12 preferably decides whether or not to send a message.

If UE 11 or 12 sends a message to UTRAN 90, the information included in the message is put into a multicast register accordingly along with identifying information, such as Group identification (ID), UE ID, etc (305 in FIG. 3). If information for UE 11 or 12 is already stored in the multicast register, then the register is updated with the new information. From this record, RNC 30 can check the starting power level for multicast data transmissions. It can also change the value of SIB signaling, if required.

Figure 4:
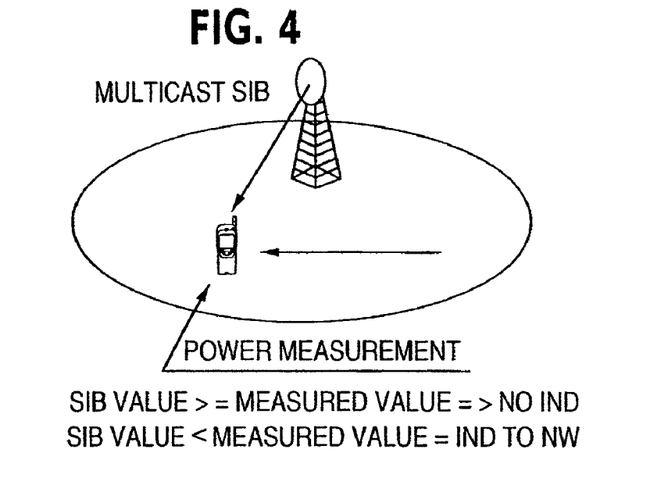
FIG. 4 illustrated the transactions performed for a UE when the UE moves within a cell according to a preferred embodiment of the invention.
Figure 5:
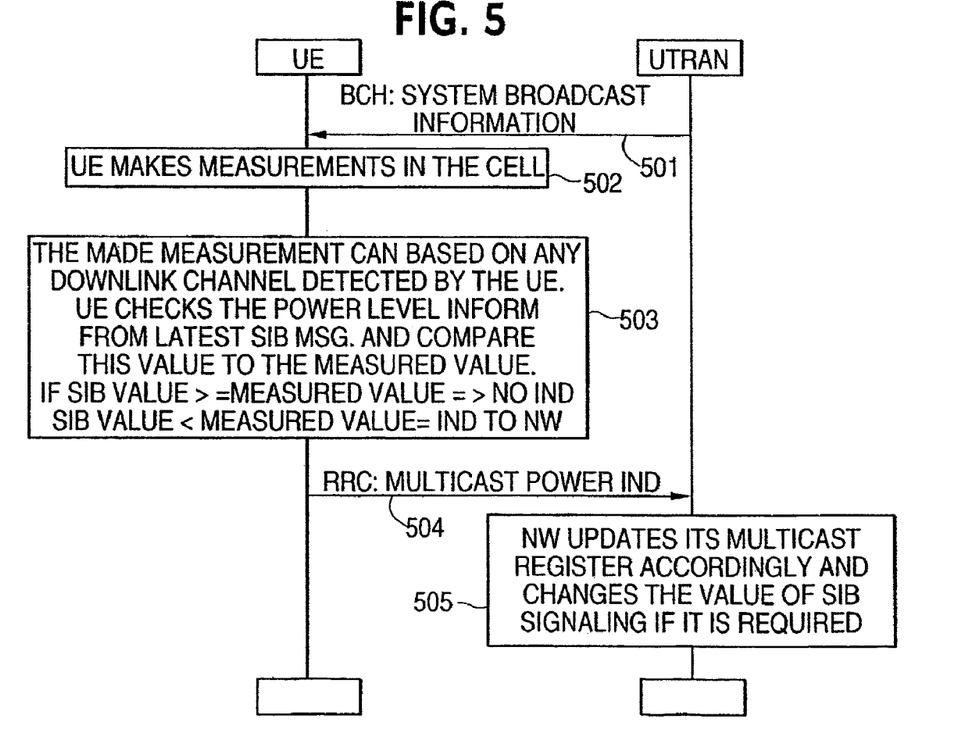
FIG. 5 is a flow diagram indicating the operations performed for a UE when the UE is moving inside a cell according to a preferred embodiment of the invention.

FIGS. 4 and 5 show the operations performed when UE 11 or 12 moves inside a cell. If UE 11 or 12 is in idle mode, it preferably measures the power level from time to time to check the possibility of performing the cell reselection procedure (502 in FIG. 5). At the same time, UE 11 or 12 can also make measurements for power control purposes. Just as described above with respect to FIGS. 2 and 3, the measurements can be based on any downlink channel received by UE 11 or 12; the power level value can be checked from information in the latest SIB messages and this value can be compared to the measured value (503 in FIG. 5). If UE 11 or 12 has moved to a place in the cell where the indicated power level is not enough, it may send a RRC Multicast Power Indication Message as described below (504 in FIG. 5) to UTRNA 90. Preferably, UE 11 or 12 can decide whether to send a message or not. The message can be transmitted on PRACHPhysical Random Access Channel (PRACH). Preferably, transmission of the message doesn't cause the establishment of an RRC connection. The mode of the Radio Link Control (RLC) layer in these circumstances should be the transparent mode and can use logical channel Common Control Channel (CCCH).

If UE 11 or 12 sends a message to UTRAN 90, the information included in the message is put into a multicast register accordingly along with identifying information, such as Group ID, UE ID, etc (505 in FIG. 5). If information for UE 11 or 12 is already stored in the multicast register, then the register is updated with the new information. From this record, RNC 30 can check the starting power level for multicast data transmissions. It can also change the value of SIB signaling if required.

If UE 11 or 12 sees that the power level to be multicast on the cell is more than adequate, no power level information is sent to UTRAN 90. Also, a relatively small difference between the received power level information and measured power level can be handled so that no indication is sent to the UE.

UE 11 or 12 can check the power level periodically based on, for example, timers supported in UE or IDLE mode measurement periods, etc. In general, it is desired that UE 11 or 12 is not unnecessarily shifted from IDLE mode to make power level measurements, but instead makes the measurements when it has other reasons to be active.

UTRAN 90 has to keep a record of the locations of the UEs authorized to receive the multicast service. This location management can be carried out as described in U.S. Patent Publication No. 2003/0119533, published Jun. 26, 2003, the disclosure of which is hereby incorporated by reference in its entirety. As described above, when UTRAN 90 receives power control information from UE 11 or 12, a record of UE 11 or 12 is created in a multicast database if it was previously unknown in the database and is updated if it was previously known. The record of power control information associated with UE 11 or 12 in the multicast database is preferably deleted at the same time other information associated with UE 11 or 12 is deleted from other databases in UTRAN 90.

Figure 6:
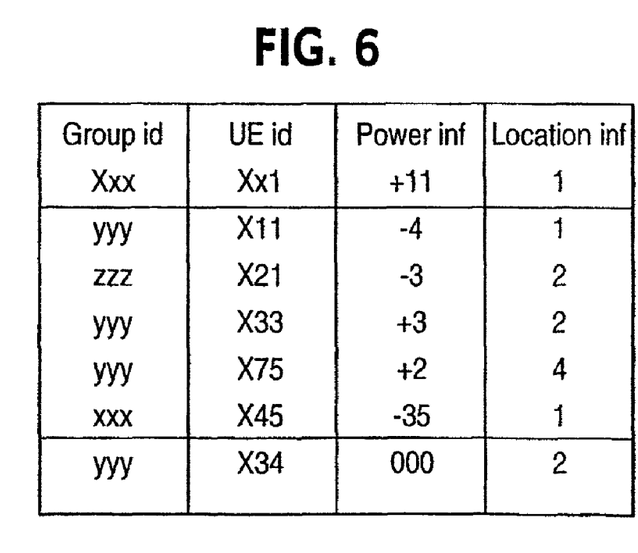
FIG. 6 is an example of the register storing power level information for UEs in a UTRAN according to a preferred embodiment of the invention.

An example of a register containing power level information and UE location information in a multicast database is shown in FIG. 6. If the power control information received from UE 11 or 12 indicate that a change of the power level (either increased or decreased) is warranted, UTRAN 90 can either change the value in an SIB signaling message or wait until some predefined number of UEs also indicate the change (increase or decrease) in the power level. The method used to indicate power level may affect this process of whether UTRAN 90 changes the value in a SIB signaling message or not.

UTRAN 90 preferably uses the power level indicated in SIB signaling messages. If during an active session, RNC 30 gets an indication (as described below) that the UE 11 or 12 which requested the power level has left the cell, then the power level can be decreased (if desired) during the active session with small steps. However, this should preferably be done until: 1) UTRAN 90 receives a new indication for the power level from one of the other authorized UEs in the cell (for this session); 2) the next highest power level is reached; or 3) the allowed number of power level reductions has been made for the session. The power level may also be periodically decreased in small steps whenever there is an absence of power level measurement indications to ensure that the power level doesn't become higher than necessary. The power level could become higher than necessary if, for example, all UE's moved closer to cell center. These are just examples, and the RNC 30 may also be set to decrease the power level in small steps in other circumstances. If a multicast service is only for a specified place, UTRAN 90 preferably shall use a fixed power level defined by a network and all UE based power level information shall be ignored.

As mentioned above, a new RRC Multicast Power Indication message can be used when UE 11 or 12 needs to transmit a new power level indication to UTRAN 90. The UEs 11 or 12, which are in IDLE mode, cell Paging Channel (PCH) and URA_PCH state can transmit such a message by using the PRACH physical channel, RACH transport channel and/or CCCH logical channel (i.e., the RLC mode used is transparent mode).

The UEs, which are in Cell_FACH state, can also send the RRC Multicast Power Indication message through PRACH/RACH by using Dedicated Control Channel (DCCH) logical channel. The timing of these messages can be varied as desired. For example, a restriction can be set so that a message is sent to UTRAN 90 only once per measurement period.

The UEs, which are in Cell_Dedicated Channel (DCH) state, may or may not be allowed to send any power level indication to UTRAN 90 because UTRAN 90 can use power level information which has already been defined for the dedicated channels.

Figure 7:
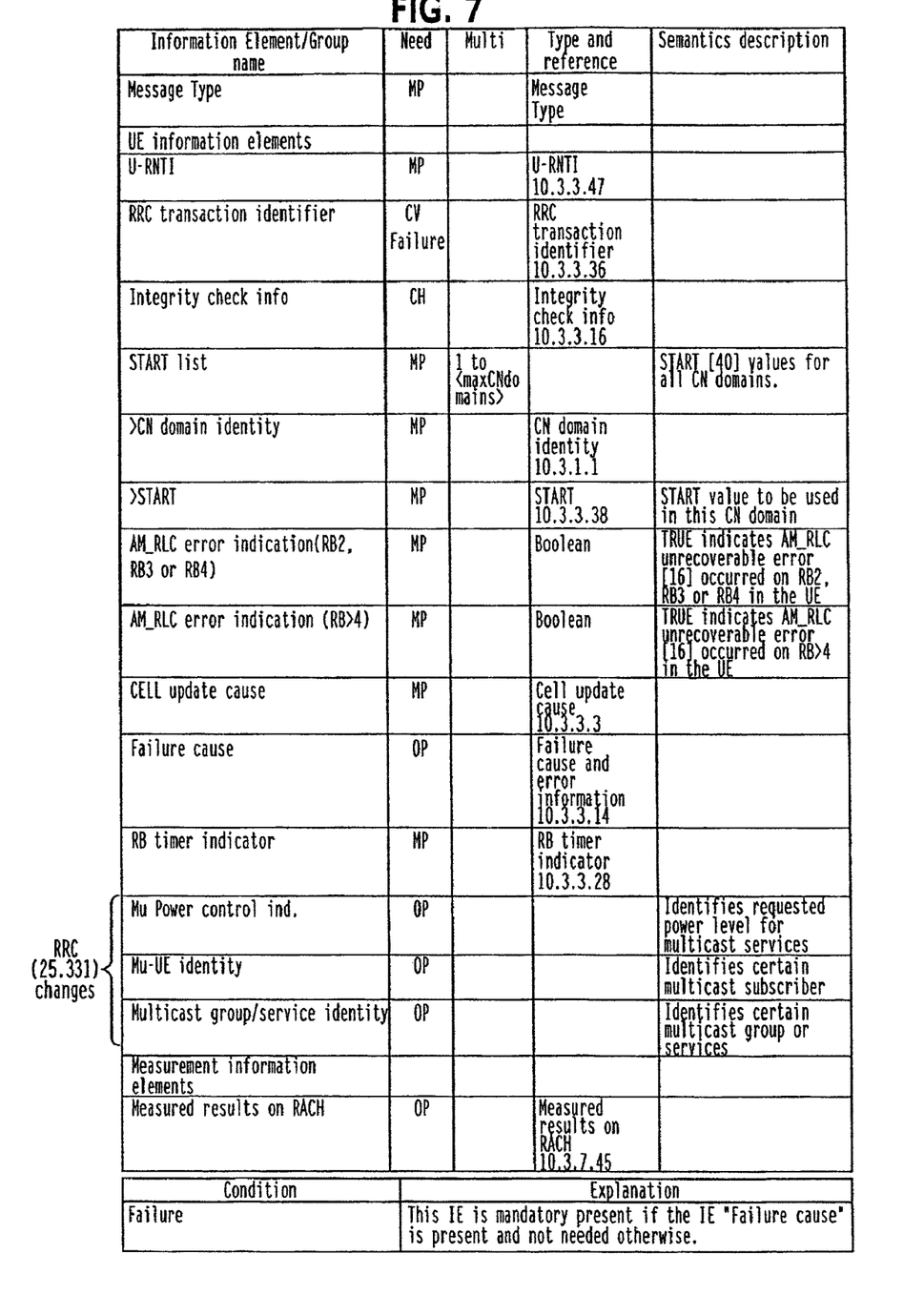
FIG. 7 is an example of a CELL UPDATE message in a preferred embodiment of the invention.
Figure 8:
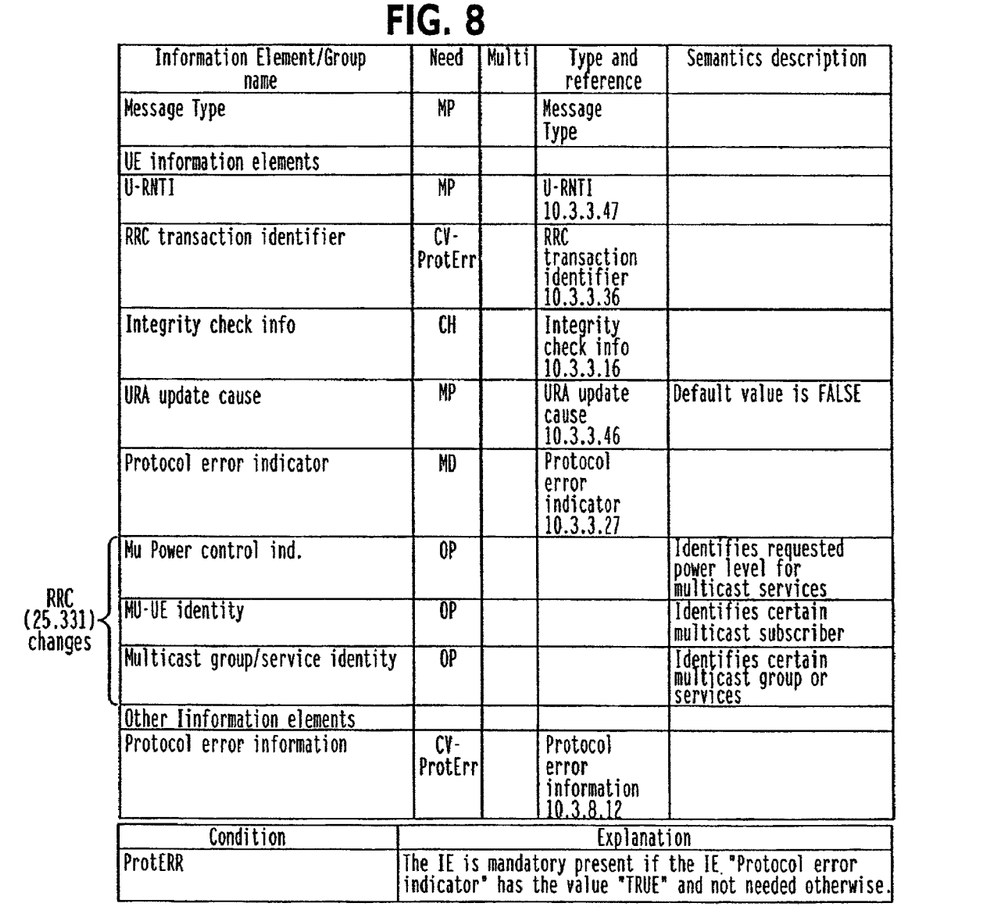
FIG. 8 is an example of the URA UPDATE message in a preferred embodiment of the invention.
Figure 9:
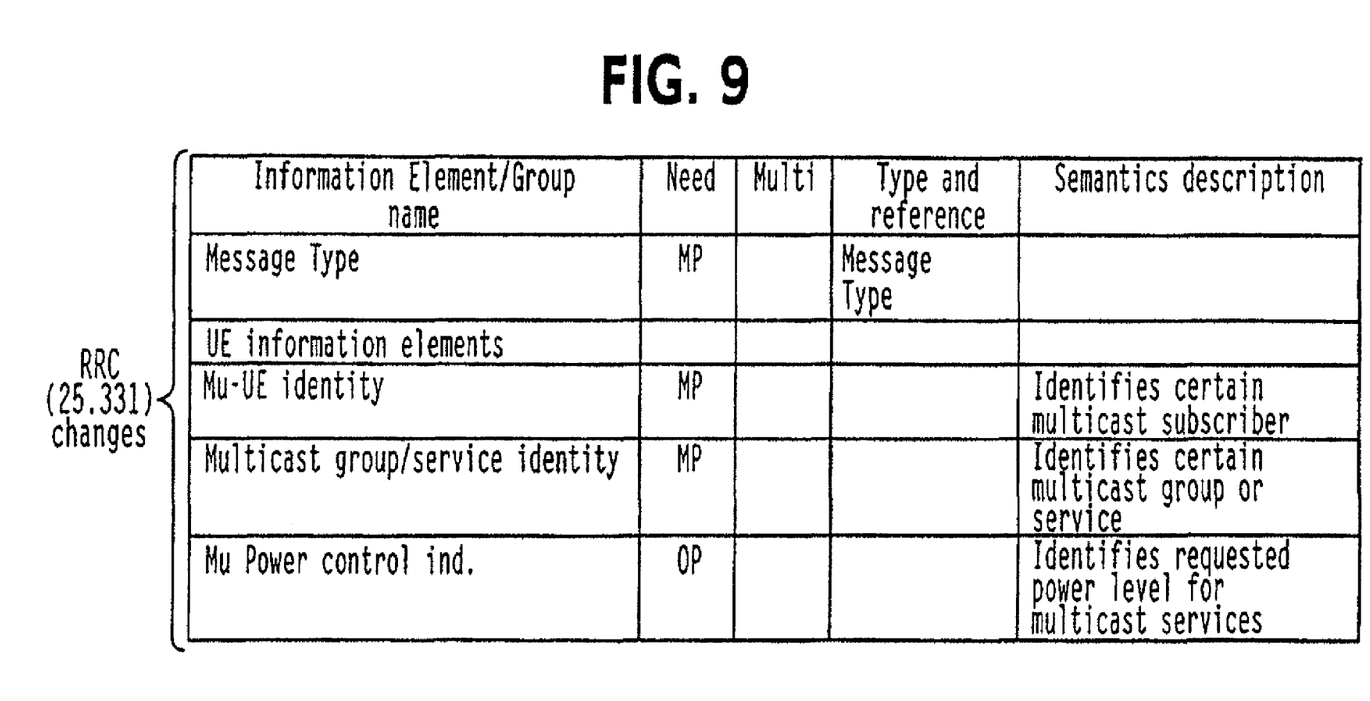
FIG. 9 illustrates the structure of a MULTICAST POWER INDICATION message in a preferred embodiment of the invention.
Figure 10:
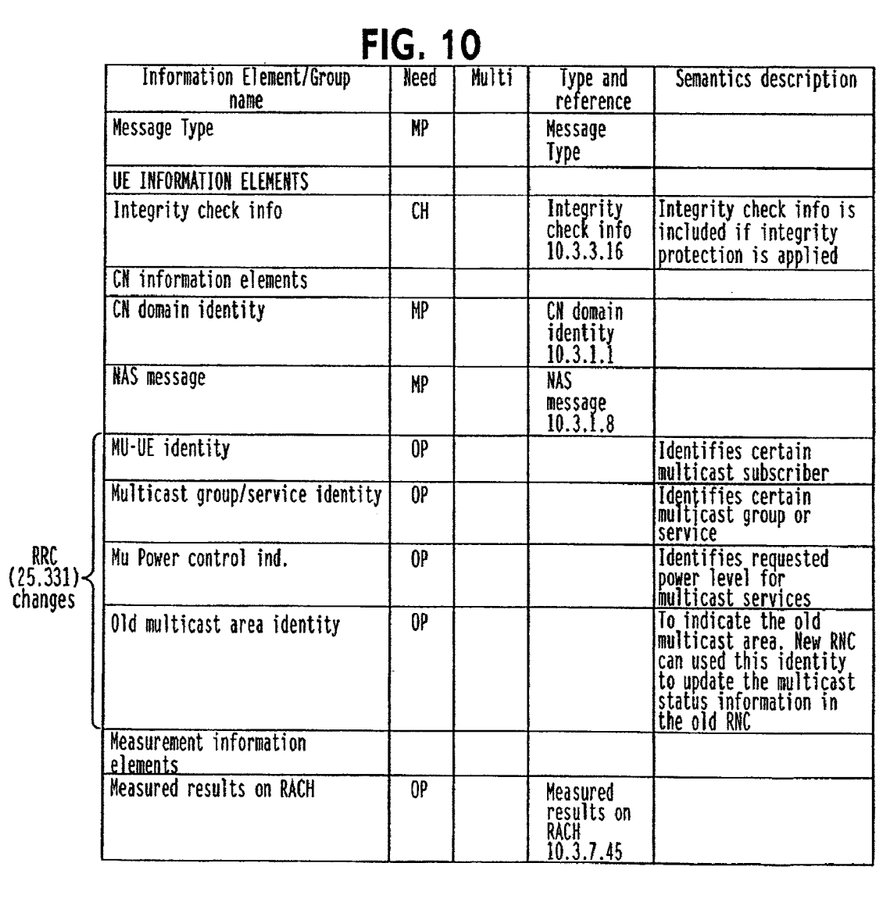
FIG. 10 illustrates the UPLINK DIRECT TRANSFER message in a preferred embodiment of the invention.

FIGS. 7, 8 and 10 present examples of the modifications which may be made to three currently existing RRC messages according to a preferred embodiment of the invention—the Cell Update message, the URA update message and the Uplink Direct Transfer message, respectively. An example of the structure which may be used for the new RRC Multicast Power Indication message is provided in FIG. 9. The references in the tables are to the numbered sections in 3GPP TS 25.331.

The SIB signaling messages preferably contain information fields for at least the "highest power level" (based on UE measurements) and the absolute highest power level accepted for a particular cell as defined by UTRAN 90. The "highest power level" indicates the power level currently defined for multicast sessions based on information received from authorized UEs. This field can be a binary field, in which case a "1" or "0" may be set to indicate that each multicast service, which is supported in a particular cell, is going to use the highest power level on the radio interface. Alternatively, the value of this field can be based on the number of multicast services (i.e., each multicast service could have a power level of its own); the priorities of the multicast services; the number of multicast services which are linked with a location+rest of the services or any combination thereof. For example, football clips may have one value because the multicast service for it is available in a football stadium only and therefore the power level can be optimized based on the location of the football stadium.

The second field for "absolute highest power level" indicates the power level, which is defined by the network operator and follows the condition of the air interface generally. The value in this field is the absolute maximum value for the multicast data transmission and no new information from an UE can change the value. The value in this field in SIB message can be based on the same principles described above for the first field.

As mentioned above, the user equipment may include power level information in a Multicast Area Update message. This message is used to transmit multicast related information when the user equipment is in IDLE, Cell_PCH and URA_PCH state. The size of this message cannot exceed the maximum size of one PRACH radio frame.

It is noted that the foregoing preferred embodiments have been provided merely for the purpose of explanation and are in no way to be construed as limiting of the present invention. While the present invention has been described with reference to preferred embodiments, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods and embodiments, the present invention is not intended to be limited to the particulars disclosed herein; rather, the present invention extends to all functionally equivalent structures, methods and uses, such as other types of wireless communication networks.

What is claimed is:

1. A user equipment, configured to:
   receive power control information associated with a first signal in a channel of a communications network;
   measure a power level of said first signal received via said channel;
   compare said measured power level of said received first signal to a power level of said power control information associated with said first signal and provide a first result therefrom;
   determine whether to transmit a first message for use in modifying said power control information depending on said first result;
   receive power control information associated with a second signal in said channel of said communications network;
   measure a power level of said second signal received via said channel;

compare said measured power level of said received second signal to a power level of said power control information associated with said second signal and provide a second result therefrom; and determine whether to transmit a second message for use in modifying said power control information depending on said second result.

2. The user equipment as recited in claim 1, wherein said power control information is employable to control a power level of a multicast data transmission associated with said channel.

3. The user equipment as recited in claim 1 further configured to transmit said first message when said first result indicates that said measured power level of said received first signal is less than said power level of said power control information associated with said received first signal.

4. The user equipment as recited in claim 1, wherein said user equipment is configured to measure said power level of said received first signal periodically.

5. The user equipment as recited in claim 1, wherein said power control information is configured to be stored in a multicast database.

6. The user equipment as recited in claim 1, wherein said first message is selected from the group consisting of:
   a cell update message,
   a universal terrestrial radio access network registration area (URA) update message,
   an uplink direct transfer message,
   a multicast area update message, and
   a multicast power indication message.

7. An article of manufacture including a computer-readable medium having instructions stored thereon that, in response to execution by a user equipment, cause the user equipment to perform operations comprising:
   measuring, at said user equipment, a power level of a first received signal;
   comparing, at said user equipment, said measured power level of said first received signal to a power level of power control information associated with said first received signal in a channel of a communications network and provide a first result therefrom;
   determining, at said user equipment, whether to transmit a first message for use in modifying said power control information depending on said first result;
   measuring, at said user equipment, a power level of a second received signal;
   comparing, at said user equipment, said measured power level of said second received signal to a power level of power control information associated with said second received signal in said channel of said communications network and provide a second result therefrom; and
   determining, at said user equipment, whether to transmit a second message for use in modifying said power control information depending on said second result.

8. The article of manufacture as recited in claim 7, wherein said power control information is employable to control a power level of a multicast data transmission associated with said channel.

9. The article of manufacture as recited in claim 7, wherein the operations further comprise causing transmission of said first message when said first result indicates that said measured power level of said first received signal is less than said power level of said power control information associated with said first received signal.

10. A method, comprising:
    receiving power control information associated with a first signal in a channel of a communications network;
    measuring a power level of said first signal received via said channel;
    comparing said measured power level of said received first signal to a power level of said power control information associated with said first signal and providing a first result therefrom;
    determining whether to transmit a first message for use in modifying said power control information depending on said first result;
    receiving power control information associated with a second signal in said channel of said communications network;
    measuring a power level of said second signal received via said channel;
    comparing said measured power level of said received second signal to a power level of said power control information associated with said second signal and provide a second result therefrom; and
    determining whether to transmit a second message for use in modifying said power control information depending on said second result,
    wherein the method is performed at a user equipment.

11. The method as recited in claim 10, wherein said power control information is employable to control a power level of a multicast data transmission associated with said channel.

12. The method as recited in claim 10 further comprising transmitting said first message when said first result indicates that said measured power level of said received first signal is less than said power level of said power control information associated with said received first signal.

13. The method as recited in claim 10, wherein said measuring a power level of said first signal is performed periodically.

14. The method as recited in claim 10, wherein said power control information is configured to be stored in a multicast database.

15. An apparatus, configured to:
    transmit power control information associated with a signal in a channel of a communications network to a user equipment, wherein said power control information corresponds to a transmitted power level of the signal;
    receive a message for use in modifying said power control information depending on a comparison, performed at said user equipment, between a power level of said signal received via said channel and measured at said user equipment and said transmitted power level of said power control information; and
    control a power level of a multicast data transmission associated with said channel as a function of information associated with said comparison and received in said message.

16. The apparatus as recited in claim 15, wherein said power level of said multicast data transmission is less than a maximum power level associated with user equipments in said communications network.

17. The apparatus as recited in claim 15 further configured to store said information associated with said comparison in a multicast database.

18. The apparatus as recited in claim 15, wherein said message is selected from the group consisting of:
    a cell update message,
    a universal terrestrial radio access network registration area (URA) update message,
    an uplink direct transfer message,
    a multicast area update message, and
    a multicast power indication message.

19. A method, comprising:
- transmitting power control information associated with a signal in a channel of a communications network to a user equipment, wherein said power control information corresponds to a transmitted power level of the signal;
- receiving a message for use in modifying said power control information depending on a comparison, performed by said user equipment, between a power level of said signal associated with said channel and measured at said user equipment and said transmitted power level of said power control information; and
- controlling a power level of a multicast data transmission associated with said channel as a function of information associated with said comparison and received in said message.

20. The method as recited in claim 19, wherein said power level of said multicast data transmission is less than a maximum power level associated with a plurality of user equipment in said communications network.

21. The method as recited in claim 19 further comprising storing said information associated with said comparison in a multicast database.

22. The method as recited in claim 19, wherein said message is selected from the group consisting of:
- a cell update message,
- a universal terrestrial radio access network registration area (URA) update message,
- an uplink direct transfer message,
- a multicast area update message, and
- a multicast power indication message.

23. An apparatus, configured to:
- receive power control information associated with a channel of a communications network;
- measure a power level of a received signal;
- compare said measured power level of said received signal to a power level of said power control information and provide a result therefrom; and
- determine whether to transmit a message for use in modifying said power control information depending on said result,
- wherein said message is selected from the group consisting of:
  - a cell update message,
  - a universal terrestrial radio access network registration area (URA) update message,
  - an uplink direct transfer message,
  - a multicast area update message, and
  - a multicast power indication message.

24. An apparatus, configured to:
- transmit power control information associated with a channel of a communications network to a user equipment;
- receive a message for use in modifying said power control information depending on a comparison between a power level of a signal received and measured at said user equipment and a power level of said power control information; and
- control a power level of a multicast data transmission associated with said channel as a function of information received in said message,
- wherein said message is selected from the group consisting of:
  - a cell update message,
  - a universal terrestrial radio access network registration area (URA) update message,
  - an uplink direct transfer message,
  - a multicast area update message, and
  - a multicast power indication message.

25. A method, comprising:
- transmitting power control information associated with a channel of a communications network to a user equipment;
- receiving a message for use in modifying said power control information depending on a comparison between a power level of a signal received and measured at said user equipment and a power level of said power control information; and
- controlling a power level of a multicast data transmission associated with said channel as a function of information received in said message,
- wherein said message is selected from the group consisting of:
  - a cell update message,
  - a universal terrestrial radio access network registration area (URA) update message,
  - an uplink direct transfer message,
  - a multicast area update message, and
  - a multicast power indication message.

26. A user equipment, comprising:
- means for receiving power control information associated with a first signal in a channel of a communications network;
- means for measuring a power level of said first signal received via said channel;
- means for comparing said measured power level of said received first signal to a power level of said power control information associated with said first signal and providing a first result therefrom;
- means for determining whether to transmit a first message for use in modifying said power control information depending on said first result;
- means for receiving power control information associated with a second signal in said channel of said communications network;
- means for measuring a power level of said second signal received via said channel;
- means for comparing said measured power level of said received second signal to a power level of said power control information associated with said second signal and provide a second result therefrom; and
- means for determining whether to transmit a second message for use in modifying said power control information depending on said second result.

27. An apparatus, comprising:
- means for transmitting power control information associated with a signal in a channel of a communications network to a user equipment, wherein said power control information corresponds to a transmitted power level of the signal;
- means for receiving a message for use in modifying said power control information depending on a comparison, performed at said user equipment, between a power level of said signal received and measured at said user equipment and said transmitted power level of said power control information; and
- means for controlling a power level of a multicast data transmission associated with said channel as a function of information received in said message.

* * * * *

UNITED STATES PATENT AND TRADEMARK OFFICE
CERTIFICATE OF CORRECTION

| | | |
|---|---|---|
| PATENT NO. | : 7,860,462 B2 | Page 1 of 1 |
| APPLICATION NO. | : 11/332751 | |
| DATED | : December 28, 2010 | |
| INVENTOR(S) | : Sarkkinen et al. | |

It is certified that error appears in the above-identified patent and that said Letters Patent is hereby corrected as shown below:

Title page, item (54), under "Title", in Column 1, Line 2, delete "TRANSMISSISON" and insert -- TRANSMISSION --.

Title page, item (76), under "Inventors", in Column 1, Line 4, delete "Koulakiots," and insert -- Koulakiotis, --.

Column 1, line 2 (in the Title), delete "TRANSMISSISON" and insert -- TRANSMISSION --.

Signed and Sealed this
Seventeenth Day of May, 2011

David J. Kappos
*Director of the United States Patent and Trademark Office*